(12) United States Patent
Dunko et al.

(10) Patent No.: US 7,610,051 B2
(45) Date of Patent: Oct. 27, 2009

(54) METHOD AND APPARATUS FOR OBTAINING LOCALIZED ELECTRONIC FEEDS IN A MOBILE DEVICE

(75) Inventors: Gregory A Dunko, Cary, NC (US); Allen Michael East, Cary, NC (US)

(73) Assignee: Telefonaktiebolaget LM Ericsson (publ), Lund (SE)

( * ) Notice: Subject to any disclaimer, the term of this patent is extended or adjusted under 35 U.S.C. 154(b) by 365 days.

(21) Appl. No.: 11/260,792

(22) Filed: Oct. 27, 2005

(65) Prior Publication Data
US 2007/0097929 A1 May 3, 2007

(51) Int. Cl.
H04M 3/42 (2006.01)
H04W 24/00 (2009.01)

(52) U.S. Cl. .................. 455/456.1; 455/414.1

(58) Field of Classification Search ............... 370/338; 455/404.2, 412.1, 414.1–414.3, 456.1; 709/203
See application file for complete search history.

(56) References Cited

U.S. PATENT DOCUMENTS

| 6,121,921 | A * | 9/2000 | Ishigaki ............... 342/357.08 |
| 7,031,724 | B2 * | 4/2006 | Ross et al. ............ 455/456.1 |
| 7,088,995 | B2 * | 8/2006 | Rao ..................... 455/418 |
| 7,412,246 | B2 * | 8/2008 | Lewis et al. ........... 455/456.1 |
| 2002/0077130 | A1 * | 6/2002 | Owensby ............... 455/466 |
| 2002/0147790 | A1 | 10/2002 | Snow |
| 2003/0135493 | A1 * | 7/2003 | Phelan et al. .............. 707/3 |
| 2003/0187984 | A1 * | 10/2003 | Banavar et al. ......... 709/225 |
| 2004/0043758 | A1 * | 3/2004 | Sorvari et al. ......... 455/414.1 |
| 2004/0252051 | A1 * | 12/2004 | Johnson ............. 342/357.09 |
| 2005/0039135 | A1 * | 2/2005 | Othmer et al. ........... 715/774 |
| 2005/0148366 | A1 * | 7/2005 | Okada ..................... 455/558 |

(Continued)

FOREIGN PATENT DOCUMENTS

EP 1276343 1/2003

(Continued)

OTHER PUBLICATIONS

Mihai. "NMEA-0183 Protocol Description". Version 2.20, Jan. 2004.*

(Continued)

*Primary Examiner*—Lester Kincaid
*Assistant Examiner*—Nathan Mitchell
(74) *Attorney, Agent, or Firm*—Coats & Bennett, P.L.L.C.

(57) ABSTRACT

A wireless communication device is configured to use location information available within the device to tailor the retrieval of electronic feed content. For example, the device may automatically use its current location to retrieve localized news feeds, localized podcasts, localized web pages, etc. In one embodiment, the device retrieves electronic feed content and then filters that content based on the location information to identify locally relevant content that may be displayed or otherwise made available to a user of the device. In another embodiment, the device provides all or part of its location information to a remote content server, and the content server sends localized content based on that information. In at least one embodiment, the device establishes and terminates subscriptions to localized feeds as needed responsive to changes in the device's current location. Further, the device may store or otherwise track locations and retrieve localized content for prior locations.

5 Claims, 5 Drawing Sheets

U.S. PATENT DOCUMENTS

| | | | |
|---|---|---|---|
| 2005/0188078 | A1 | 8/2005 | Kotzin et al. |
| 2005/0239481 | A1* | 10/2005 | Seligmann ............... 455/456.2 |
| 2006/0073812 | A1* | 4/2006 | Punaganti Venkata et al. ........................ 455/412.1 |
| 2006/0148528 | A1* | 7/2006 | Jung et al. .................. 455/566 |
| 2006/0184617 | A1* | 8/2006 | Nicholas et al. ............. 709/203 |
| 2006/0270421 | A1* | 11/2006 | Phillips et al. ............... 455/457 |
| 2006/0271560 | A1* | 11/2006 | Mitchell ....................... 707/10 |
| 2007/0060099 | A1* | 3/2007 | Ramer et al. ................ 455/405 |
| 2007/0117571 | A1* | 5/2007 | Musial .................... 455/456.1 |
| 2007/0202844 | A1* | 8/2007 | Wilson et al. ............ 455/404.2 |
| 2008/0293443 | A1* | 11/2008 | Pettinato ..................... 455/466 |

FOREIGN PATENT DOCUMENTS

WO  WO 02/087194  10/2002

OTHER PUBLICATIONS

"Dollar Rent A Car Introduces GPS Navigation; Garmin StreetPilot Technology Offers Customers Detailed Driving Instructions". PR Newswire. New York: Oct. 18, 2005. p. 1.*

"Introducing the Garmin StreetPilot c320 and c330 Navigators". PR Newswire. New York: Jan. 5, 2005. p. 1.*

PCT International Search Report, International Application No. PCT/US2006/030197, Mailed Dec. 22, 2006.

Brickley, Dan. "Basic Geo (WGS84 lat/long) Vocabulary". *W3C Semantic Web Interest Group*. Feb. 6, 2004. 7 pages. URL: http://www.w3.org/2003/01/geo/.

* cited by examiner

```
<item>
    <title> Latitude/Longitude Example </title>
    <description> Latitude/Longitude Example </description>
    <position:latitude> 40.74843 </position:latitude>
    <position:longitude> -73.98578 </position:longitude>
</item>
```

*FIG. 5*

```
<item>
    <title> City, State and Country Example </title>
    <description> City, State and Country Example </description>
    <location:city> New York City </location:city>
    <location:state> New York </location:state>
    <location:country> USA</location:county>
</item>
```

*FIG. 6*

METHOD AND APPARATUS FOR OBTAINING LOCALIZED ELECTRONIC FEEDS IN A MOBILE DEVICE

BACKGROUND OF THE INVENTION

The present invention relates to wireless communication devices, such as cellular radiotelephones, and particularly relates to receiving electronic feed content via such devices.

Proliferation of the Extensible Markup Language (XML) and other languages such as HTML and JavaScript have spawned electronic "feeds," e.g., web feeds. Electronic feeds provide access to changing item lists corresponding to electronic content available through the site hosting the feed, or available through linking from other sites. Content available through multiple sites often is referred to as "syndicated" content.

Feed-based content linking and delivery is distinct from other types of online media delivery because of its subscription model, which uses a feed, such as an RSS or Atom-based feed, to deliver electronic content. Electronic feeds generally provide summaries of their included or linked content, along with corresponding links for retrieving such content. Internet users can thus access or otherwise retrieve new content of interest from a selected feed as it becomes available by "subscribing" to the feed. Subscriptions generally provide automated notification of updated feed content and, optionally, automated retrieval of the updated content.

Part of the flexibility and power of these subscription-based electronic feeds is that they can include or link to any content type such as text, audio, video, multimedia, pictures, etc. A subscriber to a feed can modify or delete an existing subscription to that feed based on his or her personal preferences. Podcasting is a specific type of electronic feed that provides summaries and corresponding links to audio content, although podcast feeds can link to other content type, too, such as video or multimedia content.

Arguably, the most prevalent subscription scenario for electronic feed content involves a personal computer (PC) configured with the appropriate software. The term "aggregator" generally identifies computer software that assembles different electronic feeds into a consolidated form for easier presentation to the user. Aggregators targeted to specific types of electronic feeds are known by more specialized names. For example, the term "podcatcher" denotes aggregator software targeted to podcast feeds, which are generally collections of audio files (commentaries, etc.). Newsreaders represent another form of aggregator software, and typically are targeted to news subscriptions available as Really Simple Syndication (RSS) feeds.

While PCs represent the dominant platform for obtaining electronic feed content, the ever increasing sophistication of portable wireless communication devices, such as cellular handsets, make them increasingly viable platforms for accessing content through electronic feeds. Indeed, with their relatively large displays, generally good audio quality, and built-in packet data network access, cellular handsets and other wireless devices represent a convenient means of accessing electronic feed content available on public and/or private information networks. Of course, the mobile nature of such devices poses both challenges and opportunities for adapting the existing electronic subscription service models to the mobile environment.

SUMMARY OF THE INVENTION

As taught herein, a wireless communication device provides the capability to retrieve electronic content that is tailored to the device's location. According to one embodiment, a method comprises obtaining location information from a location determining function of the wireless communication device and using the location information to retrieve "localized" electronic feed content, i.e., content that is particularly relevant to a current (or past) location of the device.

Thus, a wireless communication device may be configured to use location information available within the device to tailor the retrieval of electronic feed content. For example, the device may automatically use its current location to retrieve localized news feeds, localized podcasts, localized web pages, etc. In one embodiment, the device retrieves electronic feed content and then filters or otherwise parses that content based on the location information to identify locally-relevant content that may be displayed or otherwise made available to a user of the device.

In another embodiment, the device provides all or part of its location information to a remote content server or other entity, and the content server sends localized content based on that information. Thus, a content server or other network entity may be configured to implement a method of tailoring electronic feed content retrieval by wireless communication devices based on receiving location information for a wireless communication device requesting electronic feed content, identifying localized electronic feed content based on the received location information, and, providing a return response for the wireless communication device that includes or identifies localized electronic feed content.

Regardless of whether the device filters content to identify localized information, or a remote server performs such filtering, the device may be configured to establish and terminate subscriptions to localized feeds responsive to changes in the device's current location. Further, the device may be configured to store or otherwise track locations and retrieve localized content for prior locations.

In all such embodiments, configuring the wireless communication device for tailored content retrieval may comprise including one or more appropriately configured processing circuits within the device. As an example, one or more microprocessors, DSPs, or other digital processing circuits in the device may be configured to execute computer program instructions that implement electronic content retrieval functions, which can include obtaining location information available within the device from a location determining function, for example, and using that location information to retrieve localized electronic feed content. As such, all or part of tailored electronic content retrieval as described herein may be implemented as a computer program or sub-program stored by a wireless communication device as software, firmware, or microcode.

Of course, the present invention is not limited to the above features and advantages. Those skilled in the art will recog-

BRIEF DESCRIPTION OF THE DRAWINGS

FIGS. 5 and 6 are examples of location information identifiers.

DETAILED DESCRIPTION OF THE INVENTION

Figure 1:
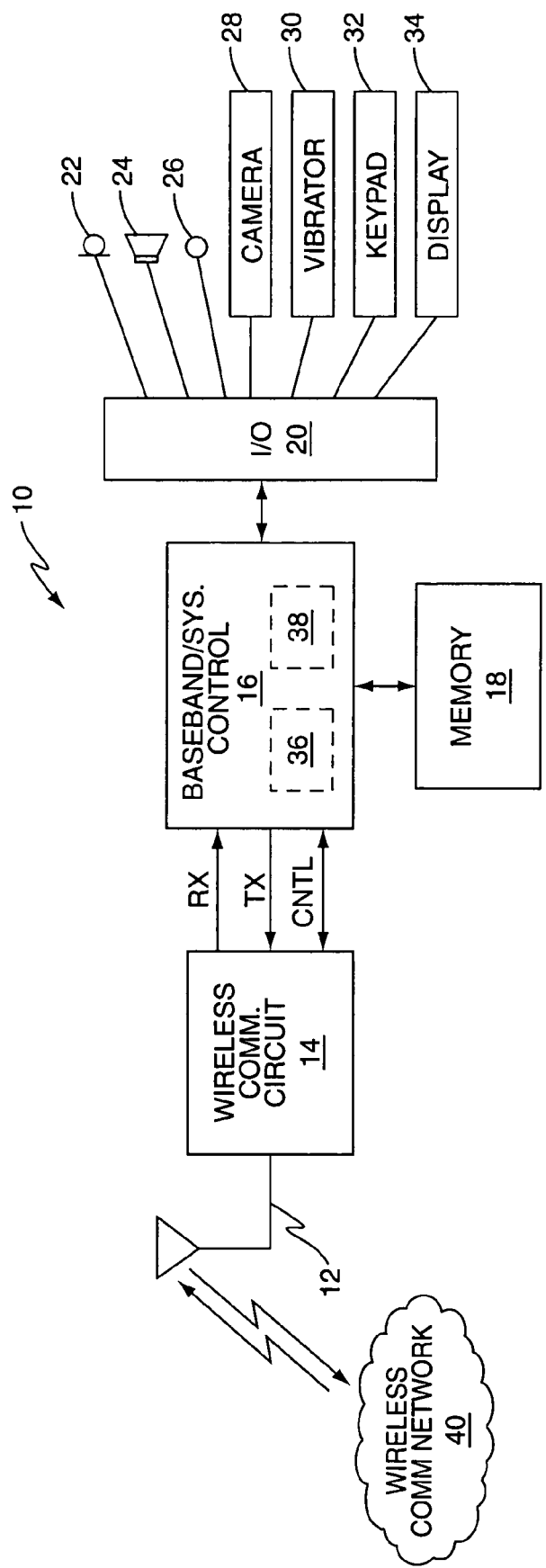
FIG. 1 is a block diagram of a wireless communication device configured to retrieve localized content from one or more electronic feeds.

FIG. 1 is a block diagram of a wireless communication device 10 that is configured for tailored electronic feed content retrieval based on current or past locations of the device 10. That is, the device 10 is configured to access or otherwise obtain electronic content that has particular relevance to its current location and/or to its past location(s).

In the illustrated embodiment, the device 10 comprises a receive/transmit antenna 12, a wireless communication circuit 14 (e.g., a cellular transceiver circuit), baseband/system control circuits 16, memory circuits 18, input/output (I/O) interface circuits 20, and a user interface including a microphone 22, a speaker 24, an audio line out circuit 26, a camera 28, a vibrator 30, a keypad 32, and a display screen 34.

Of course, it should be understood that details of the device 10 may vary according to its intended use. For example, one or more of the illustrated user interface elements may be omitted from the device 10, as needed or desired, and other user interface elements may be substituted or added. More generally, it should be understood that, unless otherwise noted in context, the term "wireless communication device" as used herein should be broadly construed as including, but not being limited to, cellular handsets, wireless pagers, PDAs, palmtop/laptop computers, etc.

The actual implementation of the wireless communication circuit 14 depends on the particular intended use of the device 10. For example, the device 10 may comprise a cellular handset configured for operation according to the cdma2000, Wideband CDMA, or GSM/GPRS standards. In another example, the device 10 may comprise a wireless handset configured for operation according to the Bluetooth, WiFi, 802.20, WiMAX, or other wireless connectivity standards. As such, the wireless communication circuit 14 may comprise a suitably configured transceiver that operates in accordance with the corresponding air interface protocols.

Turning to tailored content retrieval details in the context of the illustrated embodiment, the baseband/system control circuits 16 generally include or are associated with a location determining function 36 and a content retrieval function 38. These functions may be implemented as physical circuits or sub-systems within the device 10, or may be implemented in whole or in part as functional "circuits" embodied in computer program instructions. Regardless, it should be understood that the device 10 has location information available within its circuitry, which may have been determined by the device 10 for reasons apart from tailored content retrieval. Notably, the content retrieval function 38 makes use of that information to tailor its retrieval of electronic feed content such that localized content having particular relevance to the device's current or past location(s) is obtained, such as for display or other use at the device 10.

Thus, it should be understood that the baseband/system control circuits 16 may comprise one or more hardware circuits and/or digital processing logic executing computer program instructions that implement functional circuits. In general, it should be understood that the baseband/system control circuits 16 may comprise any desired mix of hardware and software capable of processing baseband signals and performing system control functions. As such, they may be implemented as one or more General Purpose Processors (GPPs), Digital Signal Processors (DSPs), Application Specific Integrated Circuits (ASICs), Field Programmable Gate Arrays (FPGAs), or the like, or any suitable combination thereof. Complementing processing circuit implementation flexibility, the memory circuit(s) 18 can comprise any suitable circuit types for storing static and/or dynamic information, such as, for example, DRAM, SDRAM, DDR SDRAM, SRAM, NVRAM, MRAM, Flash, NOR Flash, NAND Flash, PROM, EPROM, EEPROM, or the like or any suitable combination thereof.

With the above implementation flexibility in mind, the device 10 is configured to wirelessly communicate with a supporting wireless communication network 40, which includes or has access to one or more content servers that can provide electronic feed content to the device 10 and/or that can provide links identifying (network) locations of such content. As one example, the network 40 may comprise a WCDMA-based radio access network and one or more packet-based core networks having access to one or more public and/or private data networks, such as the Internet.

Figure 2:
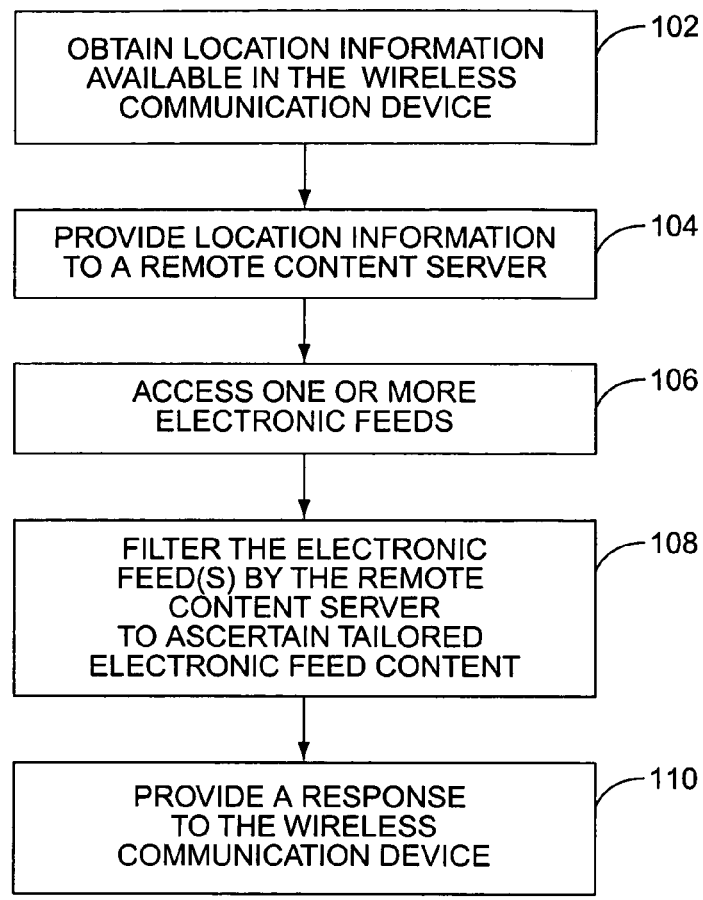
FIG. 2 is a logic flow diagram of one embodiment for retrieving localized electronic content by a wireless communication device.

In that context, the device 10 may retrieve localized content by sending current and/or past location information in conjunction with requesting electronic feed content. FIG. 2 broadly illustrates one embodiment of complementary processing logic for the remote content server, wherein current and/or past location information available in the device 10 is obtained for use in localized content retrieval (Step 102) and provided directly or indirectly to the remote content server (Step 104).

In turn, the remote content server may be configured to receive such location information, access one or more electronic feeds (Step 106), identify localized content included in the electronic feeds based on the location information (Step 108), and provide a return response for the device 10 that includes or identifies the localized electronic feed content (Step 110). That is, the content server may send the localized electronic feed content, send links (network addresses) corresponding to localized electronic feed content, or send some mix thereof. With such embodiments, the device 10 receives content that is "pre-filtered", or otherwise parsed, by the remote content server based on the provided location information.

In other embodiments, the device 10 may not send location information as part of its content request. In such embodiments, as detailed later herein, the content server may send information or links that can be filtered or parsed by the device 10 based on the location information to identify content that is relevant to a current or past location of the device 10.

Figure 3:
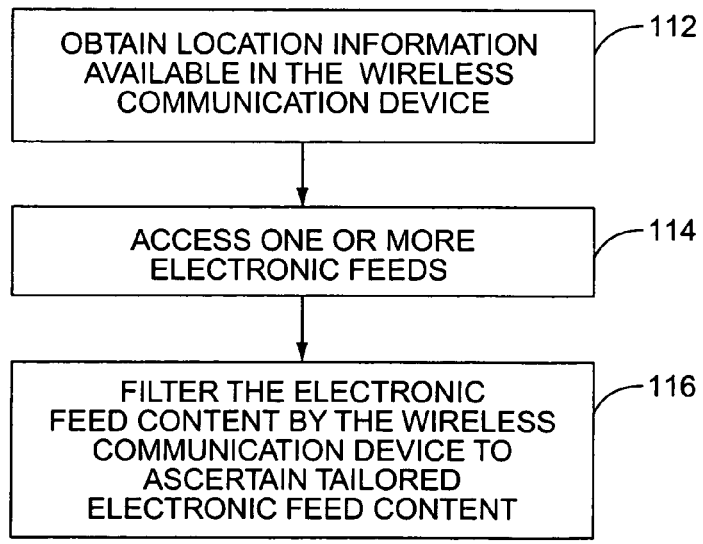
FIG. 3 is a logic flow diagram of another embodiment for retrieving localized electronic content by a wireless communication device.

In that context, the device 10 may retrieve localized content by requesting electronic feed content from a remote content server according to desired subject matter or content type preferences, for example. The device 10 can then filter or otherwise parse retrieved content based on its current or past location information to identify localized content included therein. FIG. 3 broadly illustrates one embodiment of complementary processing logic for the device 10, wherein current and/or past location information available within the device is obtained for use in localized content retrieval (Step 112).

In turn, the device 10 may access one or more electronic feeds via the remote content server and receive electronic feed content (Step 114). The device 10 identifies localized content by filtering, or parsing, the electronic feed content based on its location information (Step 116). As such, a remote content server can be utilized by the device 10 to access and retrieve electronic feeds, however, the content is not "pre-filtered" or otherwise parsed based on the device's location information. The device 10 filters, or parses, the electronic content based on its location information to retrieve localized content.

In general, then, the device 10 uses current or past location information to obtain localized content and, from the perspective of the content retrieval function 38, it may be assumed that current and/or past location information is available within the device 10 for use in retrieving localized content. It should be understood, for example, that the location determining function 36 may be included in the device 10 independently from the content retrieval function. That is, location information may be present in the device for reasons other than localized content retrieval, or as an inherent part of the device's operation within the network 40.

In any case, a number of methods exist for making location information available within the device 10. For example, the location determining function 36 may be autonomous with respect to the network 40, wherein it determines the device's location with little or no network assistance. Thus, the location determining function 36 may comprise a GPS-based position determining circuit implemented within the device 10.

In other embodiments, the location determining function 36 may comprise a network-assisted position determining function, wherein the network 40 provides time-of-arrival and/or cell location information, for example, to the device 10 to assist with position determination. In other embodiments, the location determining function 36 may comprise a network-supported position determining function, wherein the network 40 effectively "tells" the device 10 its current location. For example, the network 40 can send country, region, or city identifiers, network identifiers that map to a defined location, zip codes, telephone area codes, latitude/longitude data, etc. Thus, the device 10 may be configured to map identifiers or other information received from the network 40 to a physical location or region.

It should be understood, too, that in some embodiments, or for some types of electronic content, the "location" of the device 10 may be determined in a general sense, e.g., country, state, region, or the like. Generalized location identification of that sort may be perfectly adequate for acquiring news feeds, podcast feeds, weather feeds, time server feeds, stock market feeds, or other feeds that are relevant to potentially large geographic regions.

In other embodiments, or for some types of content, it may be desirable to use more precise location information, such as coordinate ranges or other identifiers corresponding to a particular building, block, city or town. Those skilled in the art will recognize that more precise location identification offers the opportunity to retrieve more particularly "localized" content, such as the news or podcast feeds for a particular city, which may be further restricted based on a preferred topic or subject matter identifier. (Such preferences may be set by a user of the device 10.)

Figure 4:
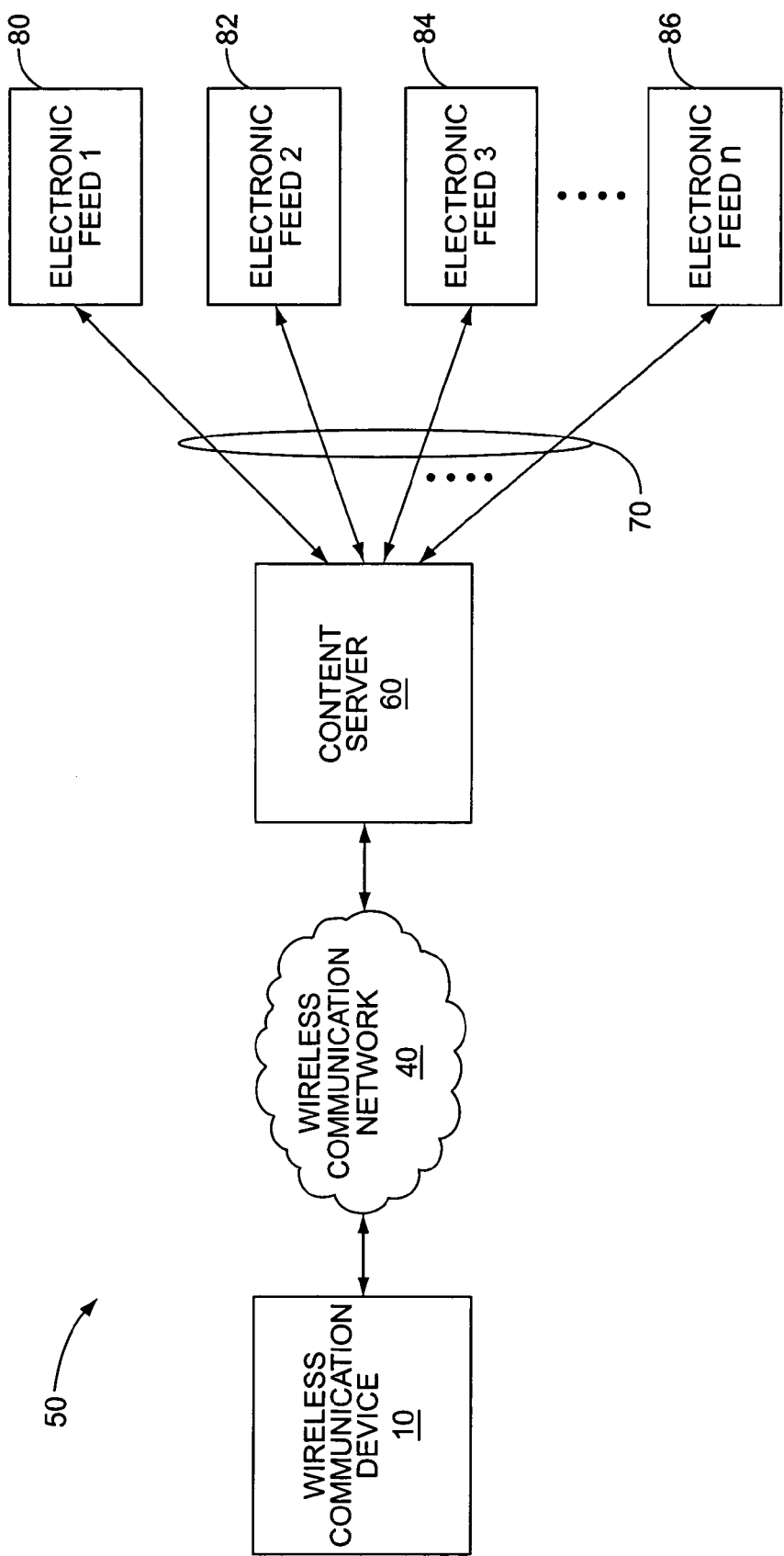
FIG. 4 is a diagram of one embodiment of a network arrangement wherein a wireless communication device is configured to retrieve localized content from one or more electronic feeds.

With the above in mind, FIG. 4 illustrates a network arrangement 50, wherein the device 10 communicates directly or indirectly with a remote content server 60 via the supporting wireless communication network 40. In the illustrated network embodiment, the remote content server 60 receives location information for the device 10, and uses that information to provide localized content, such as may be available through network connections 70, which may be Internet connections, from the electronic feeds 80-86. That is, to the extent that the electronic feeds 80-86 make a broader range of content available, the remote content server 60 may be configured to filter such information according to location information, so that localized content is provided to the device 10.

Of course, the remote content server 60 also may filter according to subject matter or content type preferences identified in the device's request, or as defined by the content feed subscriptions active in the device 10. Indeed, the remote content server 60 can modify its existing settings, or templates, for accessing the electronic feeds 80-86 according to multiple criteria or filters, and can include a number of settings, or templates, for example, stored in its memory, that determine how electronic feeds are to be accessed and filtered.

For example, for electronic feeds of the RSS type, the remote content server 60 can include settings relating to parameters such as items, channels, required elements, optional elements, categories, search results, and/or customizable elements such as namespaces. One such customizable element can be a location parameter such as the kinds previously described (e.g.; latitude/longitude coordinates, street address, city, state, zip code, country, telephone number, area code, or the like). Notably, the remote content server 60 can populate location parameters using location information received for the device 10.

For illustrative purposes only, FIG. 5 illustrates RSS 2.0 compliant code that uses the namespace feature of XML and provides customized elements for latitude (<position:latitude>) and longitude (<position:longitude>) position coordinates. In operation, the remote content server 60 can filter those electronic feeds to which the device 10 is subscribed in accordance with these latitude and longitude elements, or according to other forms of location information. For example, the remote content server 60 can parse the content of incoming electronic feeds, searching only for electronic feed content that has the same (or nearby) latitude and longitude coordinates as the device 10.

As another non-limiting example, FIG. 6 illustrates RSS 2.0 compliant code that provides customized elements for city (<location:city>), state (<location:state>), and country (<location:country>) location parameters. In operation, the remote content server 60 can filter, or parse, electronic feeds based on the city, state and country elements. Specifically, the remote content server 60 can parse the content of incoming electronic feeds, searching only for electronic feed content that has the same (or nearby) city, state, or country location as the device 10.

For example, if the current location of the device 10 is New York City, the remote content server 60 can parse the feeds 80-86, searching for electronic feed content that includes "New York City" in the <location:city> element. For podcasts, the device 10 could display and/or play those audio files related to New York City, and could further select New York-related podcasts according to subject matter, e.g., restaurant reviews.

In general, it will be understood by those skilled in the art that the electronic feeds 80-86 can be filtered in numerous ways by the remote content server 60 using the structure and/or content of the feeds 80-86, to retrieve localized electronic feed content for the device 10. As such, any manner of filtering electronic feeds in accordance with the structure and/or content of a feed and the location information associated with a wireless communication device is contemplated herein. Further, it should be understood that these filtering, selection, and identification mechanisms can be implemented in whole or in part within the content retrieval function 38 of the device 10, such that external filtering by content servers, etc., is not necessary, i.e., the device 10 can be configured to identify and retrieve locally-relevant electronic feed content.

Optionally, the device 10 and/or the remote content server 60 can track or otherwise store location information for one or more past locations of the device 10, such that the device 10 receives localized content for one or more past locations. The identification of past locations for which localized content may be desired can be based on receiving user input, or may be done automatically, such as by tracking the frequency or duration that the device 10 is in a given location. As one example, the number of times or past duration that the device 10 was in a given location, which may be defined narrowly (e.g., city) or broadly (e.g., state, region or country), may be used as a threshold trigger for automatically establishing and maintaining subscriptions to one or more electronic feeds providing access to relevant localized content. Further optionally, prior subscription history, e.g., preferences and/or tendencies, associated with one or more past locations can also be tracked and stored for subsequent use by the device 10 when receiving localized content for one or more of the past locations. As one example, the number of times or past duration a particular electronic feed was accessed by the device 10 when in a given location can be used to enhance the threshold trigger.

Further, the locations for which localized content is retrieved can be prioritized—this may be done by the user or on a partly or wholly automatic basis—such that localized content is retrieved for more than one location, say a mix of current and multiple previous locations, but is presented to the user according to location priority. Also, subject matter preferences may be set, e.g., by the user, for different locations, such that different kinds of localized content are retrieved in different cities, e.g., weather feeds are automatically downloaded in one city but not in another.

As an additional or alternative option, the device 10 can be configured to terminate subscriptions to electronic feeds that are no longer relevant. For example, the device 10 can be configured to establish new subscriptions, or modify existing subscriptions, as needed, to obtain localized content for a given city, responsive to detecting that it has moved to that location. The device 10 can be further configured to terminate or modify those subscriptions responsive to determining that it has moved outside the city or its general vicinity. This configuration allows the device 10 to automatically establish, modify, and terminate electronic feed subscriptions as needed, responsive to its changing location.

Figure 7:
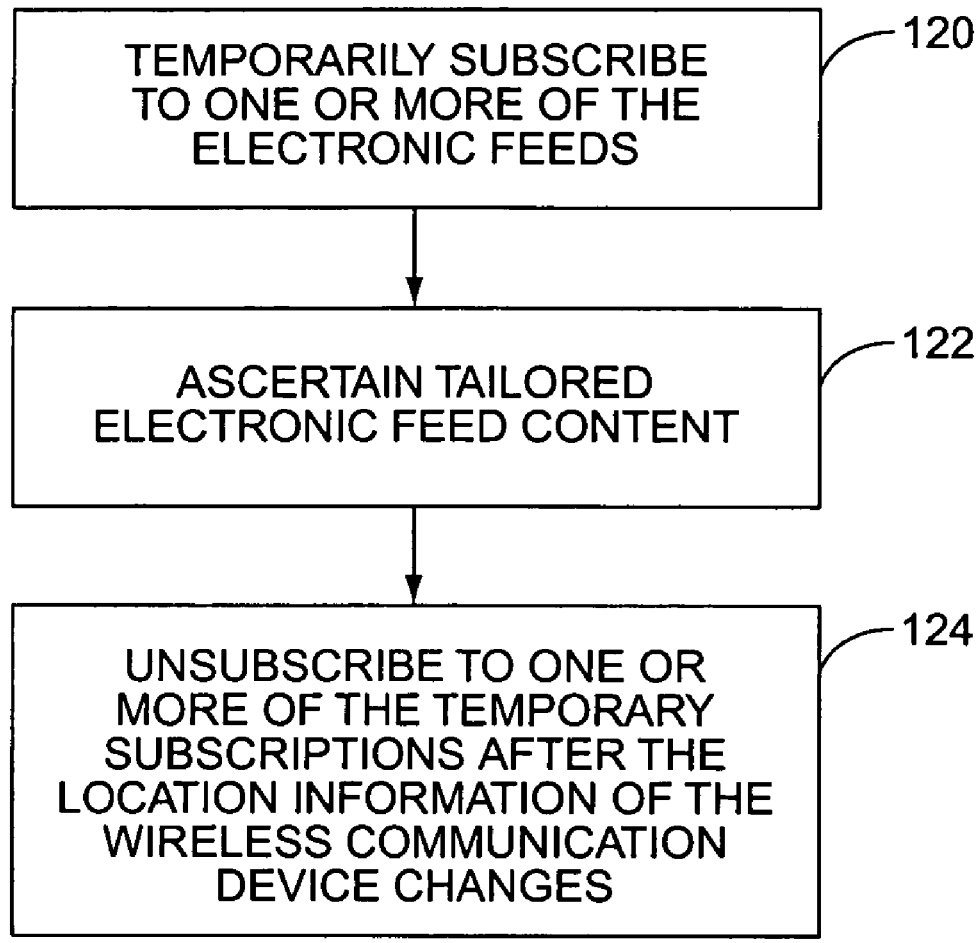
FIG. 7 is a logic flow diagram of another embodiment for retrieving localized electronic content by a wireless communication device

FIG. 7 illustrates one embodiment of processing logic implementing the above functionality, which could be embodied as computer program instructions associated with the content retrieval function 38. According to the illustrated logic, the device 10 temporarily subscribes to one or more electronic feeds that include content relevant to its current location information, for example (Step 120). The device 10 retrieves electronic feed content from these subscribed feeds while the device 10 remains in the current location, or at least within the general area (Step 122). Temporary subscriptions to electronic feeds that no longer include content relevant to an updated location of the device 10 are cancelled or otherwise modified (Step 124), and newly relevant subscriptions may be established.

The several embodiments described herein teach a wireless communication device that is configured or otherwise adapted to retrieve localized content from one or more electronic feeds, wherein the localized content is particularly relevant to a current or past location of the device. However, while the present invention has been described in terms of specific embodiments, it should be understood that it is not limited by the foregoing description, nor is it limited by the accompanying drawings. Instead, the present invention is limited only by the following claims and their legal equivalents.

What is claimed is:

1. A wireless communication device comprising one or more processing circuits configured to:
   store a plurality of previous locations of the wireless communication device;
   select one or more of the stored previous locations based on a frequency or duration of the wireless communication device being in a particular location and based on a prior subscription history associated with the particular location; and
   retrieve electronic feed content localized to the selected one or more previous locations of the wireless communication device.

2. The wireless communication device of claim 1, wherein the one or more processing circuits are configured to selectively terminate subscriptions established to one or more electronic feeds associated with the localized electronic feed content responsive to the frequency or duration of the wireless communication device being in a particular location.

3. The wireless communication device of claim 1, further configured to store the plurality of previous locations of the wireless communication device within the memory of the wireless communication device.

4. The wireless communication device of claim 1, further configured to select the one or more stored previous locations of the wireless communication device from among one or more first previous locations stored in the memory of the wireless communication device and one or more second previous locations stored within the memory of a remote content server.

5. A wireless communication device comprising one or more processing circuits configured to:
   store a plurality of previous locations of the wireless communication device;
   select one or more of the stored previous locations based on a frequency or duration of the wireless communication device being in a particular location;
   retrieve electronic feed content localized to the selected one or more previous locations of the wireless communication device; and
   selectively terminate subscriptions established to one or more electronic feeds associated with the localized electronic feed content responsive to the frequency or duration of the wireless communication device being in a particular location.

* * * * *

UNITED STATES PATENT AND TRADEMARK OFFICE
CERTIFICATE OF CORRECTION

PATENT NO.      : 7,610,051 B2
APPLICATION NO. : 11/260792
DATED           : October 27, 2009
INVENTOR(S)     : Dunko et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 688 days.

Signed and Sealed this

Twelfth Day of October, 2010

David J. Kappos
*Director of the United States Patent and Trademark Office*